United States Patent
Liang et al.

(10) Patent No.: US 12,316,793 B2
(45) Date of Patent: May 27, 2025

(54) ACCESSORY DEVICE, AND ELECTRONIC SYSTEM AND OPERATION METHOD THEREOF

(71) Applicant: ASUSTeK COMPUTER INC., Taipei (TW)

(72) Inventors: Kai-Chun Liang, Taipei (TW); Kian Ming Chee, Taipei (TW); Chia-Yu Liu, Taipei (TW); Yii-Lin Wu, Taipei (TW); Chia-Jui Shih, Taipei (TW)

(73) Assignee: ASUSTeK COMPUTER INC., Taipei (TW)

(*) Notice: Subject to any disclaimer, the term of this patent is extended or adjusted under 35 U.S.C. 154(b) by 394 days.

(21) Appl. No.: 17/880,562

(22) Filed: Aug. 3, 2022

(65) Prior Publication Data
US 2023/0058108 A1 Feb. 23, 2023

(30) Foreign Application Priority Data
Aug. 19, 2021 (TW) .................. 110130669

(51) Int. Cl.
*H04M 1/02* (2006.01)
*H02J 50/12* (2016.01)

(52) U.S. Cl.
CPC ............ *H04M 1/026* (2013.01); *H02J 50/12* (2016.02)

(58) Field of Classification Search
CPC .. H01R 13/70; H01R 13/665; H01R 13/6633; H04M 1/026; H02J 50/12
See application file for complete search history.

(56) References Cited

U.S. PATENT DOCUMENTS

| | | | |
|---|---|---|---|
| 10,170,908 B1* | 1/2019 | Catalano | H02J 7/0068 |
| 11,258,303 B2 | 2/2022 | Jung et al. | |
| 2015/0180270 A1* | 6/2015 | Takano | H01F 38/14 320/103 |
| 2018/0120915 A1* | 5/2018 | Li | G06F 1/263 |
| 2020/0220367 A1* | 7/2020 | Cho | H02J 7/00034 |

FOREIGN PATENT DOCUMENTS

| | | | | |
|---|---|---|---|---|
| BR | 102014008618 A2 | * | 10/2015 | |
| CN | 101606299 A | * | 12/2009 | ............ H02J 7/0016 |
| CN | 106469928 | | 3/2017 | |
| CN | 110880805 | | 3/2020 | |
| CN | 111884293 | | 11/2020 | |
| EP | 2008353 B1 | * | 5/2017 | ............ H02J 7/0054 |
| KR | 20140008784 A | * | 1/2014 | |

* cited by examiner

Primary Examiner — Dung Hong
(74) Attorney, Agent, or Firm — JCIPRNET

(57) ABSTRACT

An accessory device, and an electronic system and an operation method thereof are provided. The accessory device includes a functional module, a first connection interface, a second connection interface, a switch module, and a microcontroller. The first connection interface is configured to be coupled to an external first electronic device. The second connection interface is configured to be coupled to an external second electronic device. The switch module is disposed between the first connection interface and the second connection interface, and between the first connection interface and the functional module. The microcontroller controls the switch module, so that at least one of the first electronic device, the second electronic device, and the functional module supplies power to at least another one of the first electronic device, the second electronic device, and the functional module.

17 Claims, 4 Drawing Sheets

ACCESSORY DEVICE, AND ELECTRONIC SYSTEM AND OPERATION METHOD THEREOF

CROSS-REFERENCE TO RELATED APPLICATION

This application claims the priority benefit of Taiwan application serial No. 110130669, filed on Aug. 19, 2021. The entirety of the above-mentioned patent application is hereby incorporated by reference herein and made a part of the specification.

BACKGROUND OF THE INVENTION

Field of the Invention

The disclosure relates to an accessory device, and an electronic system and an operation method thereof.

Description of the Related Art

A conventional accessory device for a mobile phone or a related electronic product needs to be powered by the mobile phone or the related electronic product or an external power supply in order to drive a specific functional module on the accessory device. However, when the mobile phone or the related electronic product is to be charged in a wired charging manner through an adapter or be charged in a wireless charging manner through a wireless transmission coil, the accessory device needs to be removed from the mobile phone or the mobile phone needs to be connected to the adapter or the wireless transmission coil through an additional connector, to implement a power transmission function with an external device. In this case, the conventional accessory device no longer obtain power from the mobile phone or the related electronic product, resulting in poor user experience.

BRIEF SUMMARY OF THE INVENTION

The disclosure provides an accessory device, including a functional module, a first connection interface, a second connection interface, a switch module, and a microcontroller. The first connection interface is configured to be coupled to an external first electronic device. The second connection interface is configured to be coupled to an external second electronic device. The switch module is disposed between the first connection interface and the second connection interface, and between the first connection interface and the functional module. The microcontroller is coupled to the functional module, the first connection interface, the second connection interface, and the switch module. The microcontroller is configured to control the switch module, so that at least one of the first electronic device, the second electronic device, and the functional module supplies power to at least another one of the first electronic device, the second electronic device, and the functional module.

The disclosure further provides an electronic system, including a first electronic device, a second electronic device, and an accessory device. The accessory device includes a functional module, a first connection interface, a second connection interface, a switch module, and a microcontroller. The switch module is disposed between the first connection interface and the second connection interface, and between the first connection interface and the functional module. The microcontroller is coupled to the functional module, the first connection interface, the second connection interface, and the switch module. The first connection interface of the accessory device is coupled to a third connection interface of the first electronic device, and the second connection interface of the accessory device is coupled to a fourth connection interface of the second electronic device. The microcontroller is configured to control the switch module, so that at least one of the first electronic device, the second electronic device, and the functional module supplies power to at least another one of the first electronic device, the second electronic device, and the functional module.

The disclosure further provides an operation method applicable to an accessory device. A first connection interface of the accessory device is coupled to an external first electronic device. A second connection interface of the accessory device is coupled to an external second electronic device. A switch module of the accessory device is disposed between the first connection interface and the second connection interface, and between the first connection interface and a functional module. The operation method includes the following steps: controlling the switch module through a microcontroller; and supplying, through at least one of the first electronic device, the second electronic device, and the functional module, power to at least another one of the first electronic device, the second electronic device, and the functional module via the switch module.

Based on the above, according to the accessory device, and the electronic system and the operation method thereof of the disclosure, by controlling the switch module of the accessory device to turn on different power transmission paths, various power transmission operations among the first electronic device, the second electronic device, and the functional module are implemented.

To make the features and advantages of the disclosure clear and easy to understand, the following gives a detailed description of embodiments with reference to accompanying drawings.

DETAILED DESCRIPTION OF THE EMBODIMENTS

Figure 1:
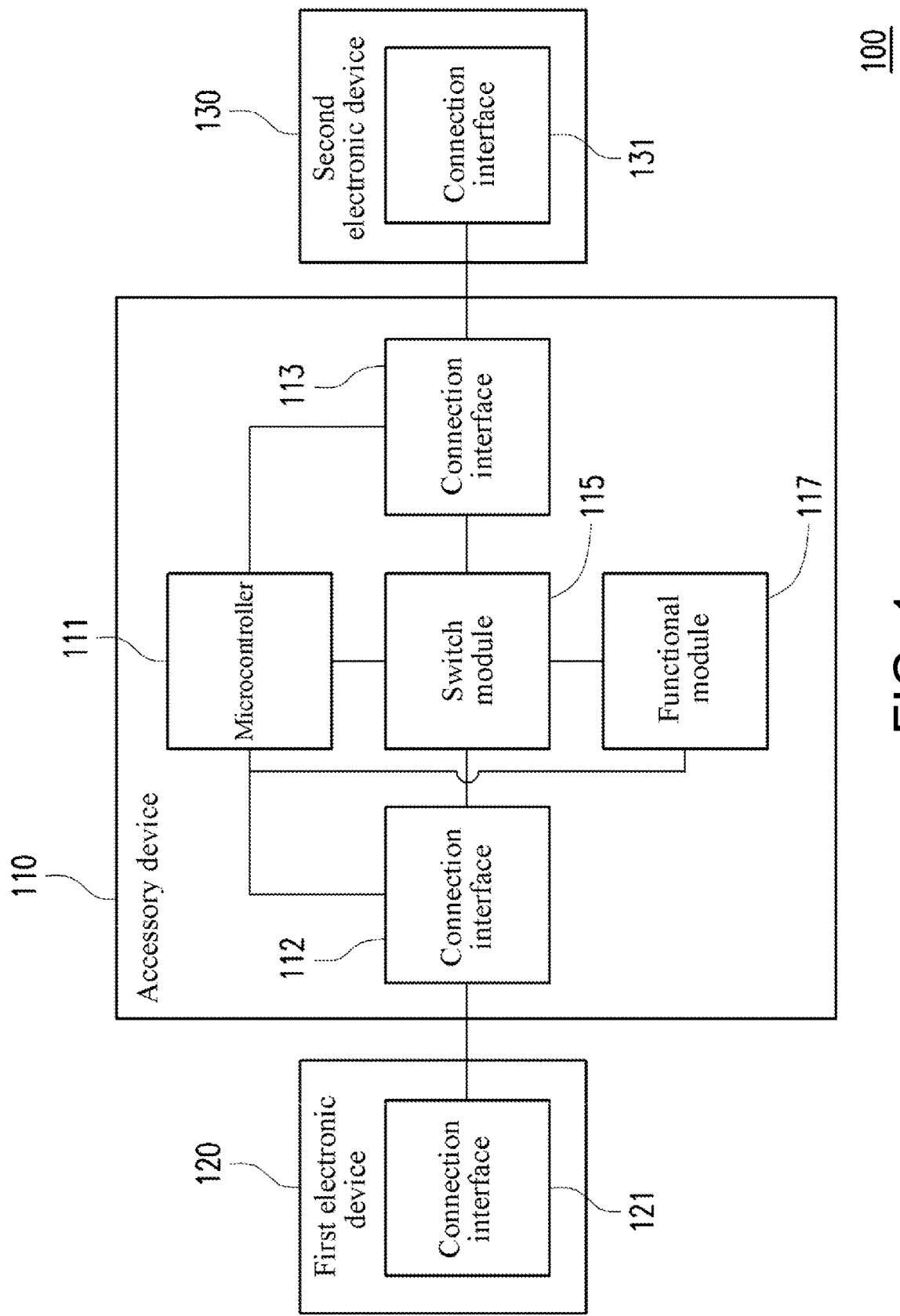
FIG. 1 is a schematic circuit diagram of an electronic system according to the disclosure.

To make the content of the disclosure more comprehensible, the embodiments are described below as examples according to which the disclosure can indeed be implemented. In addition, wherever possible, elements/components/steps with same reference numerals in the drawings and implementations represent same or similar parts.

Referring to FIG. 1, an electronic system 100 includes an accessory device 110, a first electronic device 120, and a second electronic device 130. The accessory device 110 is coupled (electrically connected) to the first electronic device 120 and the second electronic device 130. The accessory device 110 includes a microcontroller 111, connection interfaces 112 and 113, a switch module 115, and a functional module 117. The first electronic device 120 includes a connection interface 121. The second electronic device 130 includes a connection interface 131. The switch module 115 is coupled to the microcontroller 111, the connection interfaces 112 and 113, and the functional module 117. The microcontroller 111 is coupled to the connection interfaces 112 and 113 and the functional module 117. The accessory device 110 is coupled to the connection interface 121 of the first electronic device 120 through the connection interface 112, and the connection interface 113 is coupled to the connection interface 131 of the second electronic device 130.

In this embodiment, the connection interface 112 is connected to the connection interface 113 through a power line, and the connection interface 112 and the connection interface 113 are respectively connected to the functional module 117 through a plurality of other power lines. The plurality of power lines is partially connected in series, and a plurality of switch circuits of the switch module 115 is disposed on cabling paths of the plurality of power lines. The microcontroller 111 provides a plurality of switching signals to the switch module 115 through a plurality of signal lines. In this embodiment, a communication signal is transmitted between the microcontroller 111 and the first electronic device 120 through the connection interface 112 and the connection interface 121, and a communication signal is transmitted between the microcontroller 111 and the second electronic device 130 through the connection interface 113 and the connection interface 122. The first electronic device 120 further provides a control signal to the functional module 117, to control the functional module 117.

In this embodiment, the first electronic device 120 is a smartphone. In an embodiment, the first electronic device 120 is alternatively an electronic device such as a tablet, a laptop, or a desktop computer. In this embodiment, the second electronic device 130 is an adapter device, an on-to-go (OTG) device, a storage device, or another external power supply device. In this embodiment, the accessory device 110 provides a specific function through the functional module 117, and provides a power signal among the first electronic device 120, the second electronic device 130, and the functional module 117 in a multi-way transmission manner.

In this embodiment, the connection interfaces 112, 113, 121, and 131 are a hardware connection interface in conformity to a Type-C communication standard of a universal serial bus (USB). The connection interfaces 112, 113, 121, and 131 respectively include related connection circuits and ports of a plurality of pins, and are at least configured to transmit related signals such as a communication signal and a power signal through a transmission line. In other embodiments, the connection interfaces 112, 113, 121, and 131 use ports of other communication standards. In another embodiment, at least one of the connection interfaces 112, 113, 121, and 131 also uses ports of different communication standards.

Figure 2:
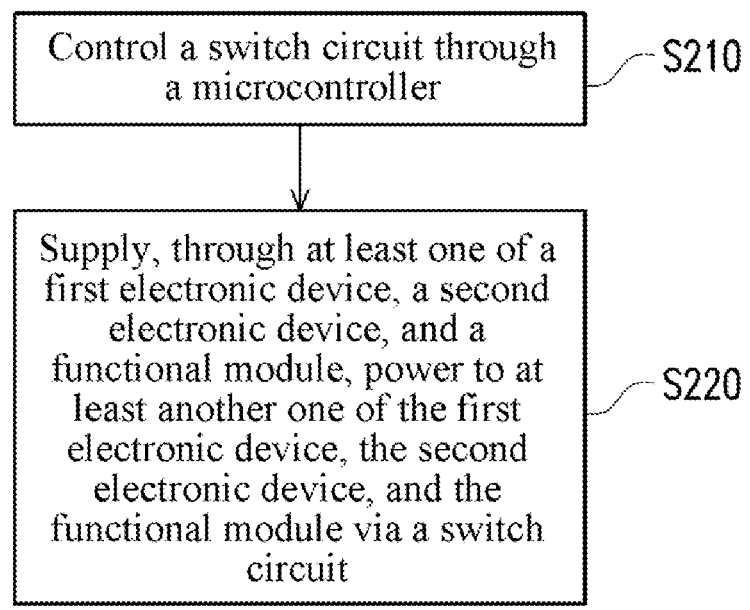
FIG. 2 is a flowchart of an operation method according to the disclosure.

Referring to FIG. 1 and FIG. 2, the accessory device 110 performs the following steps S210-S220. In step S210, the accessory device 110 controls the switch module 115 through the microcontroller 111. In step S220, the accessory device 110 supplies, through at least one of the first electronic device 120, the second electronic device 130, and the functional module 117, power to at least another one of the first electronic device 120, the second electronic device 130, and the functional module 117 via the switch module 115. In this embodiment, the microcontroller 111 provides a plurality of switching signals to a plurality of switch circuits of the switch module 115 through a plurality of signal lines, where the plurality of switch circuits is respectively disposed on cabling paths of a plurality of power lines among the first electronic device 120, the second electronic device 130, and the functional module 117. Therefore, the accessory device 110 of this embodiment switches the plurality of switch circuits of the switch module 115 through the microcontroller 111, to implement a selective multi-way power supply function among the first electronic device 120, the second electronic device 130, and the functional module 117.

Figure 3:
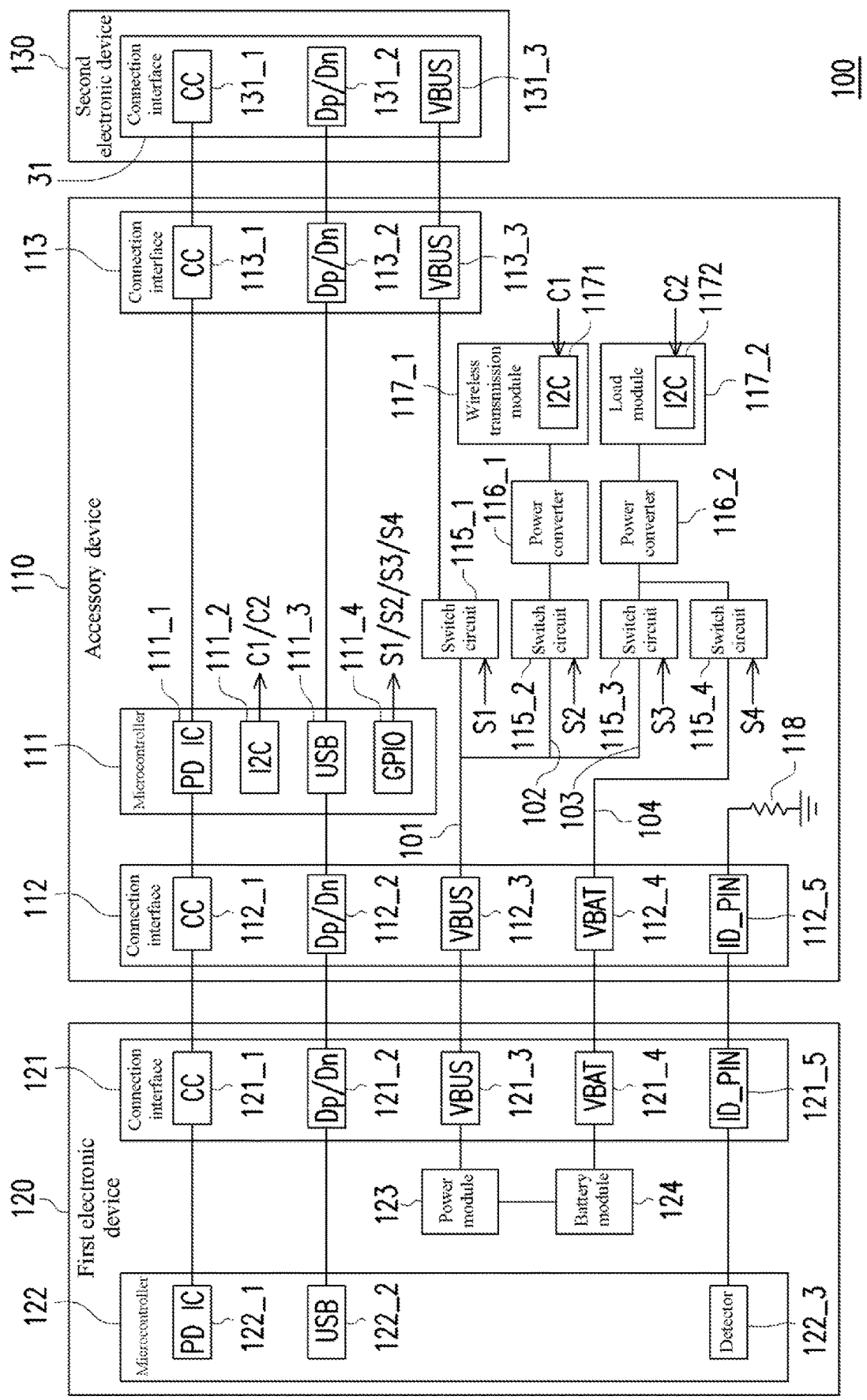
FIG. 3 is a schematic circuit diagram of another electronic system according to the disclosure.

Referring to FIG. 3, FIG. 3 is a specific circuit embodiment of the electronic system 100 of FIG. 1. In this embodiment, an accessory device 110 includes a microcontroller 111, connection interfaces 112 and 113, a switch module, power converters 116_1 and 116_2, a functional module, and a resistor 118. The switch module includes a plurality of switch circuits 115_1~115_4. The functional module includes a wireless transmission module 117_1 and a load module 117_2. A first electronic device 120 includes a connection interface 121, a microcontroller 122, a power module 123, and a battery module 124. A second electronic device 130 includes a connection interface 131. The power converters 116_1 and 116_2 are direct current (DC) to DC converters.

In this embodiment, the microcontroller 111 includes a power delivery integrated circuit (PD IC) 111_1, an inter-integrated circuit (I2C) 111_2, a USB circuit 111_3, and a general-purpose input/output (GPIO) circuit 111_4. The connection interface 112 includes a configuration channel (CC) pin 112_1, a differential signal transmission pin (Dp/Dn) 112_2 (including two pins), a power supply voltage (VBUS) pin 112_3, a battery voltage (VBAT) pin 112_4, and an identity authentication pin (ID_PIN) 112_5. The connection interface 113 includes a CC pin 113_1, a Dp/Dn 113_2 (including two pins), and a VBUS pin 113_3. The wireless transmission module 117_1 includes an I2C 1171. The load module 117_2 includes an I2C 1172.

In this embodiment, the connection interface 121 of the first electronic device 120 includes a CC pin 121_1, a Dp/Dn 121_2 (including two pins), a VBUS pin 121_3, a VBAT pin 121_4, and an ID_PIN 121_5. The VBUS pin 121_3 is coupled to the power module 123. The VBAT pin 121_4 is coupled to the battery module 124. The battery module 124 is coupled to the power module 123. The power module 123 is configured to output power of the battery module 124, or the power module 123 receives power provided by the accessory device 110 to charge the battery module 124. The ID_PIN 121_5 is coupled to one end of the resistor 118, and the other end of the resistor 118 is grounded, where the resistor 118 has a specific resistance value. The microcontroller 122 of the first electronic device 120 includes a PD IC 122_1, a USB circuit 122_2, and a detector 122_3. The connection interface 131 of the second electronic device 130 includes a CC pin 131_1, a Dp/Dn 131_2 (including two pins), and a VBUS pin 131_3.

In this embodiment, the PD IC 111_1 of the microcontroller 111 of the accessory device 110 is coupled to the CC pin 112_1 of the connection interface 112 and the CC pin 113_1 of the connection interface 113 through signal lines. The PD IC 122_1 of the microcontroller 122 of the first electronic device 120 is coupled to the CC pin 121_1 of the connection interface 121 through a signal line. When the connection interface 112 of the accessory device 110 is coupled to the connection interface 121 of the first electronic device 120, and the connection interface 113 of the accessory device 110 is coupled to the connection interface 131 of the second electronic device 130, a power control signal is transmitted between the microcontroller 111 of the accessory device 110 and the microcontroller 122 of the first electronic device 120, and a power control signal is also transmitted between the microcontroller 111 of the accessory device 110 and the second electronic device 130. Moreover, a power control signal is also transmitted between the first electronic device 120 and the second electronic device 130 through the accessory device 110.

In this embodiment, the USB circuit 111_3 of the microcontroller 111 of the accessory device 110 is coupled to the Dp/Dn 112_2 of the connection interface 112 and the Dp/Dn 113_2 of the connection interface 113 through signal lines. The USB circuit 122_2 of the microcontroller 122 of the first electronic device 120 is coupled to the Dp/Dn 121_2 of the connection interface 121 through a signal line. When the connection interface 112 of the accessory device 110 is coupled to the connection interface 121 of the first electronic device 120, and the connection interface 113 of the accessory device 110 is coupled to the connection interface 131 of the second electronic device 130, communication or data signal transmission is performed between the microcontroller 111 of the accessory device 110 and the microcontroller 122 of the first electronic device 120, and communication or data signal transmission is also performed between the microcontroller 111 of the accessory device 110 and the second electronic device 130. Moreover, communication or data signal transmission is performed between the first electronic device 120 and the second electronic device 130 through the accessory device 110.

In this embodiment, when the connection interface 112 of the accessory device 110 is coupled to the connection interface 121 of the first electronic device 120, the CC pin 112_1, the Dp/Dn 112_2, the VBUS pin 112_3, the VBAT pin 112_4, and the ID_PIN 112_5 of the connection interface 112 are coupled to the CC pin 121_1, the Dp/Dn 121_2, the VBUS pin 121_3, the VBAT pin 121_4, and the ID_PIN 121_5 of the connection interface 121 of the first electronic device 120. In this embodiment, when the connection interface 113 of the accessory device 110 is coupled to the connection interface 131 of the second electronic device 130, the CC pin 113_1, the Dp/Dn 113_2, and the VBUS pin 113_3 of the connection interface 113 are coupled to the CC pin 131_1, the Dp/Dn 131_2, and the VBUS pin 131_3 of the connection interface 131 of the second electronic device 130.

In this embodiment, the VBUS pin 112_3 of the connection interface 112 of the accessory device 110 is coupled to the VBUS pin 113_3 of the connection interface 113 via the switch circuit 115_1 and a power line 101, and the switch circuit 115_1 is disposed on a cabling path of the power line 101.

In this embodiment, the I2C 1171 of the wireless transmission module 117_1 of the accessory device 110 is coupled to the I2C 111_2 of the microcontroller 111, to receive a control signal C1 output by the I2C 111_2 of the microcontroller 111. In this embodiment, the wireless transmission module 117_1 is coupled to the VBUS pin 112_3 of the connection interface 112 via the switch circuit 115_2 and a power line 102, where the power line 102 is connected in series to the power line 101. The switch circuit 115_2 and the power converter 116_1 are disposed on a cabling path of the power line 102. In this embodiment, the wireless transmission module 117_1 communicates with another external wireless transmission module, or transmits a wireless charging signal with an external wireless charging module. The wireless transmission module 117_1 further includes a charging/power supply coil. In this embodiment, the power converter 116_1 converts a voltage of a power signal received by the switch circuit 115_2 into a voltage in conformity to a usage specification of the wireless transmission module 117_1. Alternatively, the power converter 116_1 converts a voltage of a power signal received by the wireless transmission module 117_1 into a voltage in conformity to a usage specification of the accessory device 110.

In this embodiment, the I2C 1172 of the load module 117_2 of the accessory device 110 is coupled to the I2C 111_2 of the microcontroller 111, to receive a control signal C2 output by the I2C 111_2 of the microcontroller 111. The load module 117_2 is coupled to the VBUS pin 112_3 of the connection interface 112 via the switch circuit 115_3 and a power line 103, where the power line 103 is connected in series to the power line 101. The switch circuit 115_3 and the power converter 116_2 are disposed on a cabling path of the power line 103. In this embodiment, the load module 117_2 is an energy dissipation device such as a storage device, a fan device, or a light emitting device. In this embodiment, the power converter 116_2 converts a voltage of a power signal received by the switch circuit 115_3 into a voltage in conformity to a usage specification of the load module 117_2.

In this embodiment, the VBAT pin 112_4 of the connection interface 112 of the accessory device 110 is coupled to the load module 117_2 via the switch circuit 115_4 and a power line 104, where the switch circuit 115_4 and the power converter 116_2 are disposed on a cabling path of the power line 104. In this embodiment, the ID_PIN 112_5 of the connection interface 112 of the accessory device 110 is coupled to the resistor 118. In this embodiment, the detector 122_3 of the first electronic device 120 detects the resistor 118 through the ID PINs 121_5 and 112_5, to confirm that the accessory device 110 is an exclusive accessory; and then communication, such as data communication or transmission, is performed among the accessory device 110, the first electronic device 120, and the second electronic device 130 through the Dp/Dns 121_2, 112_2, 113_2, and 131_2. The communication is also performed among the accessory device 110, the first electronic device 120, and the second electronic device 130 through the CC pins 121_1, 112_1, 113_1, and 131_1. In an embodiment, different power supply modes are varied to implement a variety of power transmission operations. In this way, the microcontroller 111 respectively outputs switching signals S1~S4 to the switch circuits 115_1~115_4 through the GPIO circuit 111_4, so that at least one of the first electronic device 120, the second electronic device 130, and the functional module 117 supplies power to at least another one of the first electronic device 120, the second electronic device 130, and the functional module 117. In this way, a plurality of operation mode examples is provided below for illustrating the power transmission means of the accessory device 110 of the disclosure.

In a first operation mode, the accessory device 110 is coupled or not coupled to the second electronic device 130. The microcontroller 111 turns on the switch circuit 115_4, and turns off the switch circuits 115_1~115_3. In this way, the battery module 124 of the first electronic device 120 supplies power to the load module 117_2 through the VBAT pins 121_4 and 112_4 and via the switch circuit 115_4.

In a second operation mode, the accessory device 110 is coupled to both the first electronic device 120 and the second electronic device 130. The microcontroller 111 turns on the switch circuits 115_1 and 115_3, and turns off the switch circuits 115_2 and 115_4. In this way, the second electronic device 130 supplies power to the first electronic device 120 and/or the load module 117_2 via the switch circuit 115_1 and/or the switch circuit 115_3. In other words, the accessory device 110 obtains, through the switch circuit 115_1, power provided by the second electronic device 130, and provides, after deducting required power, the remaining power to the first electronic device 120 and/or the load module 117_2 through the switch circuit 115_1 and/or the switch circuit 115_3.

In a third operation mode, the accessory device 110 is coupled to both the first electronic device 120 and the second electronic device 130. The microcontroller 111 turns on the switch circuits 115_1 and 115_3, and turns off the switch circuits 115_2 and 115_4. In this way, the first electronic device 120 supplies power to the second electronic device 130 and/or the load module 117_2 via the switch circuit 115_1 and/or the switch circuit 115_3. In other words, the accessory device 110 obtains power provided by the first electronic device 120, and provides, after deducting required power, the remaining power to the second electronic device 130 and/or the load module 117_2 through the switch circuit 115_1 and/or the switch circuit 115_3.

In a fourth operation mode, the accessory device 110 is coupled to both the first electronic device 120 and the second electronic device 130. The microcontroller 111 turns on the switch circuits 115_1 and 115_2, and turns off the switch circuits 115_3 and 115_4. In this way, the power module 123 of the first electronic device 120 supplies power to the second electronic device 130 and/or the wireless transmission module 117_1 via the switch circuit 115_1 and/or the switch circuit 115_2. The wireless transmission module 117_1 is used as a transmit end (TX) of wireless charging. In other words, the accessory device 110 obtains power provided by the first electronic device 120, and provides, after deducting required power, the remaining power to the second electronic device 130 and/or the wireless transmission module 117_1 through the switch circuit 115_1 and/or the switch circuit 115_2.

In a fifth operation mode, the accessory device 110 is coupled to both the first electronic device 120 and the second electronic device 130. The microcontroller 111 turns on the switch circuits 115_1 and 115_2, and turns off the switch circuits 115_3 and 115_4. In this way, the second electronic device 130 supplies power to the first electronic device 120 and/or the wireless transmission module 117_1 via the switch circuit 115_1 and/or the switch circuit 115_2. The wireless transmission module 117_1 is used as a TX of wireless charging. In other words, the accessory device 110 obtains, through the switch circuit 115_1, power provided by the second electronic device 130, and provides, after deducting required power, the remaining power to the first electronic device 120 and/or to the wireless transmission module 117_1 through the switch circuit 115_2.

In a sixth operation mode, the accessory device 110 is coupled to both the first electronic device 120 and the second electronic device 130. The microcontroller 111 turns on the switch circuits 115_1 and 115_2, and turns off the switch circuits 115_3 and 115_4. In this way, the wireless transmission module 117_1 supplies power to the first electronic device 120 and/or the second electronic device 130 via the switch circuit 115_1 and/or the switch circuit 115_2 according to a wireless charging signal provided by an external wireless charging device. The wireless transmission module 117_1 is used as a receive end (RX) of wireless charging. In other words, the accessory device 110 obtains, through the switch circuit 115_2, power provided by the wireless transmission module 117_1, and provides, after deducting required power, the remaining power to the first electronic device 120 and/or to the second electronic device 130 through the switch circuit 115_1.

In a seventh operation mode, the accessory device 110 is coupled to both the first electronic device 120 and the second electronic device 130. The microcontroller 111 turns on the switch circuits 115_1~115_3, and turns off the switch circuit 115_4. In this way, the first electronic device 120 supplies power to at least one of the second electronic device 130, the wireless transmission module 117_1, and the load module 117_2 via at least one of the switch circuits 115_1~115_3. The wireless transmission module 117_1 is used as a TX of wireless charging. In other words, the accessory device 110 obtains power provided by the first electronic device 120, and provides, after deducting required power, the remaining power to at least one of the second electronic device 130, the wireless transmission module 117_1, and the load module 117_2 through at least one of the switch circuits 115_1~115_3.

In an eighth operation mode, the accessory device 110 is coupled to both the first electronic device 120 and the second electronic device 130. The microcontroller 111 turns on the switch circuits 115_1~115_3, and turns off the switch circuit 115_4. In this way, the second electronic device 130 supplies power to at least one of the first electronic device 120, the wireless transmission module 117_1, and the load module 117_2 via at least one of the switch circuits 115_1~115_3. The wireless transmission module 117_1 is used as a TX of wireless charging. In other words, the accessory device 110 obtains, through the switch circuit 115_1, power provided by the second electronic device 130, and provides, after deducting required power, the remaining power to the first electronic device 120 and/or to at least one of the wireless transmission module 117_1 and the load module 117_2 through at least one of the switch circuits 115_2 and 115_3.

In a ninth operation mode, the accessory device 110 is coupled to both the first electronic device 120 and the second electronic device 130. The microcontroller 111 turns on the switch circuits 115_1~115_3, and turns off the switch circuit 115_4. In this way, the wireless transmission module 117_1 supplies power to at least one of the first electronic device 120, the second electronic device 130, and the load module 117_2 via at least one of the switch circuits 115_1~115_3 according to a wireless charging signal provided by an external wireless charging device. The wireless transmission module 117_1 is used as an RX of wireless charging. In other words, the accessory device 110 obtains, through the switch circuit 115_2, power provided by the wireless transmission module 117_1, and provides, after deducting required power, the remaining power to the first electronic device 120 and/or to at least one of the second electronic device 130 and the load module 117_2 through at least one of the switch circuits 115_1 and 115_3.

In a tenth operation mode, the accessory device 110 is coupled or not coupled to the second electronic device 130. The microcontroller 111 turns on the switch circuits 115_2 and 115_3, and turns off the switch circuits 115_1 and 115_4. In this way, the wireless transmission module 117_1 supplies power to the first electronic device 120 and/or the load module 117_2 via the switch circuit 115_2 and/or the switch circuit 115_3 according to a wireless charging signal provided by an external wireless charging device. The wireless transmission module 117_1 is used as an RX of wireless charging. In other words, the accessory device 110 obtains, through the switch circuit 115_2, power provided by the wireless transmission module 117_1, and provides, after deducting required power, the remaining power to the first electronic device 120 and/or to the load module 117_2 through the switch circuit 115_3.

In an eleventh operation mode, the accessory device 110 is coupled or not coupled to the second electronic device 130. The microcontroller 111 turns on the switch circuits 115_2 and 115_4, and turns off the switch circuits 115_1 and 115_3. In this way, the power module 123 of the first electronic device 120 supplies power to the wireless transmission module 117_1 via the switch circuit 115_2, and the battery module 124 of the first electronic device 120 supplies power to the load module 117_2 via the switch circuit 115_4. The wireless transmission module 117_1 is used as a TX of wireless charging. In this way, the accessory device 110 obtains power provided by the first electronic device 120, and provides, after deducting required power, the remaining power to the wireless transmission module 117_1 through the switch circuit 115_2, and the battery module 124 of the first electronic device 120 directly supplies power to the load module 117_2 through the switch circuit 115_4.

In a twelfth operation mode, the accessory device 110 is coupled to both the first electronic device 120 and the second electronic device 130. The microcontroller 111 turns on the switch circuits 115_1, 115_2, and 115_4, and turns off the switch circuit 115_3. In this way, the power module 123 of the first electronic device 120 supplies power to the second electronic device 130 and/or the wireless transmission module 117_1 via the switch circuit 115_1 and/or the switch circuit 115_2, and the battery module 124 of the first electronic device 120 supplies power to the load module 117_2 via the switch circuit 115_4. The wireless transmission module 117_1 is used as a TX of wireless charging. In other words, the accessory device 110 obtains power provided by the first electronic device 120, and provides, after deducting required power, the remaining power to the second electronic device 130 and/or the wireless transmission module 117_1 through the switch circuit 115_1 and/or the switch circuit 115_2. Moreover, the battery module 124 of the first electronic device 120 directly supplies power to the load module 117_2 through the switch circuit 115_4.

In a thirteenth operation mode, the accessory device 110 is coupled to both the first electronic device 120 and the second electronic device 130. The microcontroller 111 turns on the switch circuits 115_1, 115_2, and 115_4, and turns off the switch circuit 115_3. In this way, the second electronic device 130 supplies power to the first electronic device 120 and/or the wireless transmission module 117_1 via the switch circuit 115_1 and/or the switch circuit 115_2, and the battery module 124 of the first electronic device 120 supplies power to the load module 117_2 via the switch circuit 115_4. The wireless transmission module 117_1 is used as a TX of wireless charging. In other words, the accessory device 110 obtains power provided by the second electronic device 130 through the switch circuit 115_1, and provides, after deducting required power, the remaining power to the first electronic device 120 and/or to the wireless transmission module 117_1 through the switch circuit 115_2. Moreover, the battery module 124 of the first electronic device 120 directly supplies power to the load module 117_2 through the switch circuit 115_4.

In a fourteenth operation mode, the accessory device 110 is coupled to both the first electronic device 120 and the second electronic device 130. The microcontroller 111 turns on the switch circuits 115_1, 115_2, and 115_4, and turns off the switch circuit 115_3. In this way, the wireless transmission module 117_1 supplies power to the first electronic device 120 and/or the second electronic device 130 via the switch circuit 115_1 and/or the switch circuit 115_2 according to a wireless charging signal provided by an external wireless charging device. The wireless transmission module 117_1 is used as an RX of wireless charging. In other words, the accessory device 110 obtains, through the switch circuit 115_2, power provided by the wireless transmission module 117_1, and provides, after deducting required power, the remaining power to the first electronic device 120 and/or to the second electronic device 130 through the switch circuit 115_1. Moreover, the battery module 124 of the first electronic device 120 directly supplies power to the load module 117_2 through the switch circuit 115_4.

In a fifteenth operation mode, the accessory device 110 is coupled to both the first electronic device 120 and the second electronic device 130. The microcontroller 111 turns on the switch circuit 115_1, and turns off the switch circuits 115_2~115_4. In this way, the power module 123 of the first electronic device 120 supplies power to the second electronic device 130 via the switch circuit 115_1, or the second electronic device 130 supplies power to the first electronic device 120 via the switch circuit 115_1, so that the power module 123 charges the battery module 124.

Figure 4:
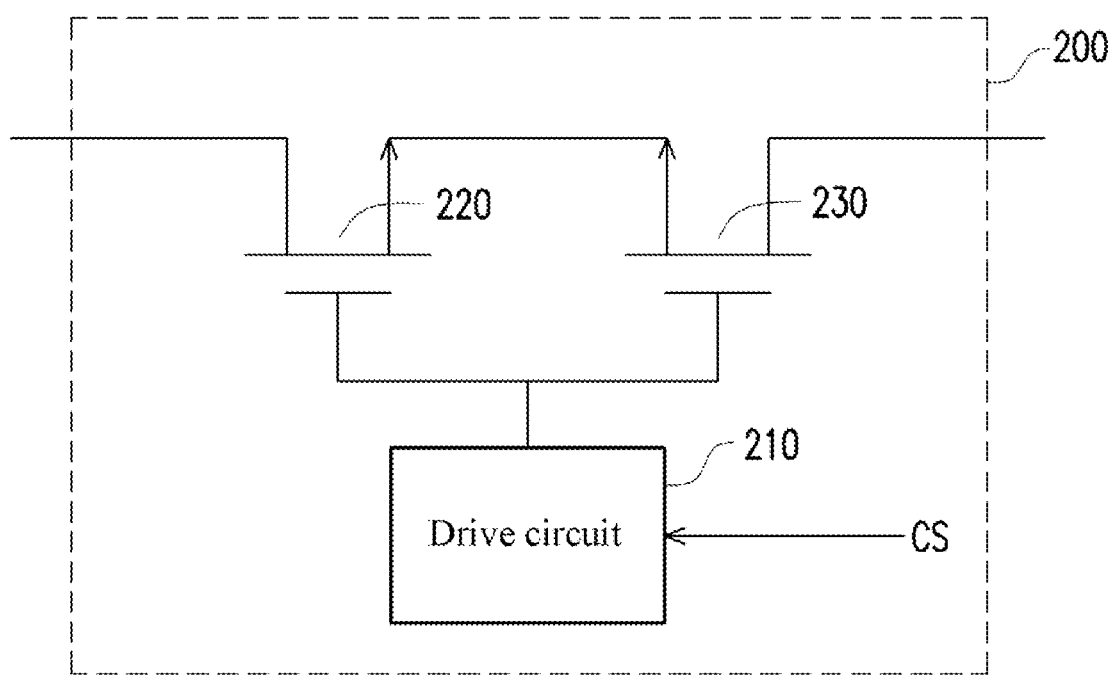
FIG. 4 is a schematic circuit diagram of a switch circuit according to the disclosure.

FIG. 4 is a schematic circuit diagram of a switch circuit according to an embodiment of the disclosure. Referring to FIG. 4, the switch circuits 115_1~115_4 in the embodiment of FIG. 3 respectively include a specific circuit element of a switch circuit 200 shown in FIG. 4. In this embodiment, the switch circuit 200 includes a drive circuit 210 and switch transistors 220 and 230. The switch transistors 220 and 230 are an N-type transistor. The drive circuit 210 is coupled to control ends of the switch transistors 220 and 230. A first end of the switch transistor 220 is coupled to a first power line. A second end of the switch transistor 220 is coupled to a second end of the switch transistor 230. A first end of the switch transistor 230 is coupled to a second power line.

In this embodiment, the drive circuit 210 receives a switching signal CS (in an embodiment, at least one of switching signals S1~S4 in the embodiment of FIG. 3), to determine to output a high voltage signal to the control ends of the switch transistors 220 and 230 to open (turn on) the switch transistors 220 and 230, or output a low voltage signal to the control ends of the switch transistors 220 and 230 to close (turn off) the switch transistors 220 and 230. In an embodiment, when the switch transistors 220 and 230 are turned on, and a first power signal is transmitted from the first power line, the first power signal flows through the switch transistors 220 and 230 to the second power line. When the switch transistors 220 and 230 are turned on, and a second power signal is transmitted from the second power line, the second power signal flows through the switch transistors 220 and 230 to the first power line. When the switch transistors 220 and 230 are turned off, the power signal does not pass through. Moreover, a coupling manner of the switch transistors 220 and 230 effectively prevents a leakage current from flowing out via parasitic diodes of the switch transistors 220 and 230. In this way, the switch circuits 115_1~115_4 in the embodiment of FIG. 3 using the circuit structure of FIG. 4 implement a function of selectively turning on or turning off two-way power signal transmission.

However, the switch circuits 115_1~115_4 in the embodiment of FIG. 3 are not limited to the examples of FIG. 4. In an embodiment of the disclosure, the switch circuits 115_1~115_4 in the embodiment of FIG. 3 are respectively performed by a single switch transistor, or generally include a circuit element in another switching circuit design that implements a turn-on function and a turn-off function after receiving the control signals described in the foregoing embodiments.

In conclusion, the accessory device, and the electronic system and the operation method thereof of the disclosure selectively switch the plurality of switch circuits on transmission paths of the plurality of power signals of the accessory device according to different power supply requirements, to implement a multi-way power transmission effect among the first electronic device, the second electronic device, and the functional module.

Although the disclosure has been described with reference to the above embodiments, the embodiments are not intended to limit the disclosure. A person of ordinary skill in the art may make variations and improvements without departing from the spirit and scope of the disclosure. Therefore, the protection scope of the disclosure should be subject to the appended claims.

What is claimed is:

1. An accessory device, comprising:
   a functional module;
   a first connection interface, configured to be coupled to an external first electronic device;
   a second connection interface, configured to be coupled to an external second electronic device;
   a switch module, disposed between the first connection interface and the second connection interface, and between the first connection interface and the functional module; and
   a microcontroller, coupled to the functional module, the first connection interface, the second connection interface, and the switch module, and configured to control the switch module, so that at least one of the first electronic device, the second electronic device, and the functional module supplies power to at least another one of the first electronic device, the second electronic device, and the functional module,
   wherein a power supply voltage (VBUS) pin of the first connection interface is coupled to the second connection interface via a first switch circuit of the switch module; and
   the microcontroller outputs a first switching signal to the first switch circuit, and when the microcontroller turns on the first switch circuit, the first electronic device supplies power to the second electronic device via the first switch circuit, or the second electronic device supplies power to the first electronic device via the first switch circuit.

2. The accessory device according to claim 1, wherein the functional module comprises:
   a wireless transmission module, coupled to the microcontroller, and coupled to the VBUS pin of the first connection interface and the first switch circuit via a second switch circuit of the switch module, wherein
   the microcontroller outputs a first control signal to the wireless transmission module, and outputs a second switching signal to the second switch circuit.

3. The accessory device according to claim 2, wherein when the microcontroller turns on the first switch circuit and the second switch circuit, at least one of the first electronic device, the second electronic device, and the wireless transmission module supplies power to at least another one of the first electronic device, the second electronic device, and the wireless transmission module via at least one of the first switch circuit and the second switch circuit; and
   when the microcontroller turns off the first switch circuit and turns on the second switch circuit, the first electronic device supplies power to the wireless transmission module via the second switch circuit, or the wireless transmission module supplies power to the first electronic device via the first switch circuit according to a wireless charging signal.

4. The accessory device according to claim 2, wherein the functional module further comprises:
   a load module, coupled to the microcontroller, and coupled to the VBUS pin of the first connection interface, the first switch circuit, and the second switch circuit via a third switch circuit of the switch module, wherein
   the microcontroller outputs a second control signal to the load module, and outputs a third switching signal to the third switch circuit.

5. The accessory device according to claim 4, wherein when the microcontroller turns off the first switch circuit and the second switch circuit, and turns on the third switch circuit, the first electronic device supplies power to the load module via the third switch circuit;
   when the microcontroller turns off the first switch circuit, and turns on the second switch circuit and the third switch circuit, the wireless transmission module supplies power to the load module via the second switch circuit and the third switch circuit; and
   when the microcontroller turns off the second switch circuit, and turns on the first switch circuit and the third switch circuit, the second electronic device supplies power to the load module via the first switch circuit and the third switch circuit.

6. The accessory device according to claim 4, wherein a battery voltage (VBAT) pin of the first connection interface is coupled to the load module via a fourth switch circuit of the switch module;
   the microcontroller outputs a fourth switching signal to the fourth switch circuit; and
   when the microcontroller turns on the fourth switch circuit, the first electronic device supplies power to the load module via the fourth switch circuit.

7. An electronic system, comprising:
   a first electronic device;
   a second electronic device; and
   an accessory device, comprising a functional module, a first connection interface, a second connection interface, a switch module, and a microcontroller, wherein the switch module is disposed between the first connection interface and the second connection interface, and between the first connection interface and the functional module, and the microcontroller is coupled to the functional module, the first connection interface, the second connection interface, and the switch module;
   the first connection interface of the accessory device is coupled to a third connection interface of the first electronic device, and the second connection interface of the accessory device is coupled to a fourth connection interface of the second electronic device; and
   the microcontroller is configured to control the switch module, so that at least one of the first electronic device, the second electronic device, and the functional module supplies power to at least another one of the first electronic device, the second electronic device, and the functional module,
   wherein a power supply voltage (VBUS) pin of the first connection interface is coupled to the second connection interface via a first switch circuit of the switch module; and the microcontroller outputs a first switching signal to the first switch circuit, and when the microcontroller turns on the first switch circuit, the first electronic device supplies power to the second electronic device via the first switch circuit, or the second electronic device supplies power to the first electronic device via the first switch circuit.

8. The electronic system according to claim 7, wherein the functional module comprises:
a wireless transmission module, coupled to the microcontroller, and coupled to the VBUS pin of the first connection interface and the first switch circuit via a second switch circuit of the switch module, wherein
the microcontroller outputs a first control signal to the wireless transmission module, and outputs a second switching signal to the second switch circuit.

9. The electronic system according to claim 8, wherein when the microcontroller turns on the first switch circuit and the second switch circuit, at least one of the first electronic device, the second electronic device, and the wireless transmission module supplies power to at least another one of the first electronic device, the second electronic device, and the wireless transmission module via at least one of the first switch circuit and the second switch circuit; and
when the microcontroller turns off the first switch circuit and turns on the second switch circuit, the first electronic device supplies power to the wireless transmission module via the second switch circuit, or the wireless transmission module supplies power to the first electronic device via the first switch circuit according to a wireless charging signal.

10. The electronic system according to claim 8, wherein the functional module further comprises:
a load module, coupled to the microcontroller, and coupled to the VBUS pin of the first connection interface, the first switch circuit, and the second switch circuit via a third switch circuit of the switch module, wherein
the microcontroller outputs a second control signal to the load module, and outputs a third switching signal to the third switch circuit.

11. The electronic system according to claim 10, wherein when the microcontroller turns off the first switch circuit and the second switch circuit, and turns on the third switch circuit, the first electronic device supplies power to the load module via the third switch circuit;
when the microcontroller turns off the first switch circuit, and turns on the second switch circuit and the third switch circuit, the wireless transmission module supplies power to the load module via the second switch circuit and the third switch circuit; and
when the microcontroller turns off the second switch circuit, and turns on the first switch circuit and the third switch circuit, the second electronic device supplies power to the load module via the first switch circuit and the third switch circuit.

12. The electronic system according to claim 10, wherein a battery voltage (VBAT) pin of the first connection interface is coupled to the load module via a fourth switch circuit of the switch module;
the microcontroller outputs a fourth switching signal to the fourth switch circuit; and
when the microcontroller turns on the fourth switch circuit, the first electronic device supplies power to the load module via the fourth switch circuit.

13. An operation method, applicable to an accessory device, wherein a first connection interface of the accessory device is configured to be coupled to an external first electronic device, and a second connection interface of the accessory device is configured to be coupled to an external second electronic device; a switch module of the accessory device is disposed between the first connection interface and the second connection interface, and between the first connection interface and a functional module; and the operation method comprises:
controlling the switch module through a microcontroller; and
supplying, through at least one of the first electronic device, the second electronic device, and the functional module, power to at least another one of the first electronic device, the second electronic device, and the functional module via the switch module,
wherein a power supply voltage (VBUS) pin of the first connection interface is coupled to the second connection interface via a first switch circuit of the switch module, and the operation method further comprises:
outputting a first switching signal to the first switch circuit; and
when turning on the first switch circuit, supplying power to the second electronic device via the first switch circuit through the first electronic device, or supplying power to the first electronic device via the first switch circuit through the second electronic device.

14. The operation method according to claim 13, wherein a wireless transmission module of the functional module is coupled to the VBUS pin of the first connection interface and the first switch circuit via a second switch circuit of the switch module, and the operation method further comprises:
outputting a first control signal to the wireless transmission module, and outputting a second switching signal to the second switch circuit;
when turning on the first switch circuit and the second switch circuit, supplying, through at least one of the first electronic device, the second electronic device, and the wireless transmission module, power to at least another one of the first electronic device, the second electronic device, and the wireless transmission module via at least one of the first switch circuit and the second switch circuit; and
when turning off the first switch circuit and turning on the second switch circuit, supplying power to the wireless transmission module via the second switch circuit through the first electronic device, or supplying power to the first electronic device via the first switch circuit according to a wireless charging signal through the wireless transmission module.

15. The operation method according to claim 14, wherein a load module of the functional module is coupled to the VBUS pin of the first connection interface, the first switch circuit, and the second switch circuit via a third switch circuit of the switch module, and the operation method further comprises:
outputting a second control signal to the load module, and outputting a third switching signal to the third switch circuit; and
when turning off the first switch circuit and the second switch circuit and turning on the third switch circuit, supplying power to the load module via the third switch circuit through the first electronic device.

16. The operation method according to claim 15, further comprising:
when turning off the first switch circuit and turning on the second switch circuit and the third switch circuit, supplying power to the load module via the second switch circuit and the third switch circuit through the wireless transmission module; and when turning off the second switch circuit and turning on the first switch circuit and the third switch circuit, supplying power to the load module via the first switch circuit and the third switch circuit through the second electronic device.

17. The operation method according to claim 15, wherein a battery voltage (VBAT) pin of the first connection interface is coupled to the load module via a fourth switch circuit of the switch module, and the operation method further comprises:

outputting a fourth switching signal to the fourth switch circuit; and when turning on the fourth switch circuit, supplying power to the load module via the fourth switch circuit through the first electronic device.

* * * * *